United States Patent [19]
Brewer

[11] 3,900,812
[45] Aug. 19, 1975

[54] STRAIN GAGE TRANSDUCER

[75] Inventor: Given A. Brewer, Marion, Mass.

[73] Assignee: Brewer Engineering Laboratories, Inc., Marion, Mass.

[22] Filed: Mar. 25, 1974

[21] Appl. No.: 454,460

[52] U.S. Cl. ................... 338/2; 73/141 A; 338/5
[51] Int. Cl. ............................................. G01l 1/22
[58] Field of Search ............... 338/2, 5; 73/141 A

[56] References Cited
UNITED STATES PATENTS

| | | | |
|---|---|---|---|
| 2,488,347 | 11/1949 | Thurston | 338/5 |
| 2,867,707 | 1/1959 | MacDonald | 338/5 |
| 3,101,420 | 8/1963 | Hufferd et al. | 73/DIG. 4 |
| 3,124,770 | 3/1964 | Ciavatta | 338/5 |
| 3,153,772 | 10/1964 | Dorr | 73/141 A |
| 3,520,182 | 7/1970 | Kelk et al. | 73/141 A |

*Primary Examiner*—C. L. Albritton

[57] ABSTRACT

A strain gage transducer for use in a radially confined space has a support portion including a base and outer wall structure extending from the perimeter of the base, a columnar member secured to the base internally of the outer wall structure and extending therebeyond, providing a contact end, and strain gage elements secured to the columnar member between the base and the contact end.

3 Claims, 11 Drawing Figures

3,900,812

STRAIN GAGE TRANSDUCER

This invention relates to strain gage transducers or load cells.

Strain gage transducers are used in a variety of industrial environments to provide accurate information about operating loads on various machinery; this information may be used to adjust the machinery for optimum running conditions or may be useful in designing new machinery for the same purpose. In particular, in steel rolling mills it is often desired to measure the forces on the pinch rolls through which the strip steel passes. This is done by inserting one or more transducers or load cells into the bearing supports for the rolls.

However, unless the mill equipment has been specially designed or modified for the use of such load cells, the conventional bearing boxes in current use do not provide the necessary radial space to accommodate conventional load cells.

Transducers ordinarily have a columnar element supported on a base, the strain gage resistance wire elements being secured to the columnar element. The columnar element must be long enough to provide space for the transducers and to permit uniform stress distribution on the gages caused by the imposed loads.

The transducer of conventional design has an overall length too great to be accommodated in the conventional bearing boxes. If the transducer is shortened while retaining the conventional design, the columnar element will be too short and the transducer will not give reliable or accurate results.

It is an object of this invention to provide a transducer for use in apparatus providing a confined radial space for such transducer, such as a conventional bearing box, that provides accurate and reliable results and whose use does not require redesign or replacement of such apparatus.

It is another object of the invention to provide, in combination with a bearing assembly, novel bearing mounting means which are also used to measure bearing stresses.

According to the invention, there is provided a strain gage transducer for use in a radially confined space, comprising a support portion including a base and outer wall structure extending from the perimeter of the base, a columnar member secured to the base internally of the outer wall structure and extending therebeyond, providing a contact end, and at least one strain gage element secured to the columnar member between the base and the contact end.

In preferred embodiments, the support portion is cup shaped, the flat base closing one end of the outer wall, and the columnar member is concentrically spaced within the outer wall.

In combination with a bearing assembly having an outer non-rotatable element with a cylindrical outer surface, positioned within a fixed bearing support having an inner surface spaced radially outwardly from the bearing non-rotatable element outer surface, a plurality of such transducers comprise part of a bearing mounting means for measuring bearing stresses, together with a plurality of pads positioned adjacent the inner surface of the bearing support. The contact end of a transducer is in contact with a pad for transmission of forces from the pad to the transducer. The bearing assembly is supported externally solely by the bearing mounting means, which is preferably at least three or four in number.

Other objects, features and advantages will appear from the following description of a preferred embodiment of the invention, taken together with the attached drawings thereof, in which.

Figure 1:
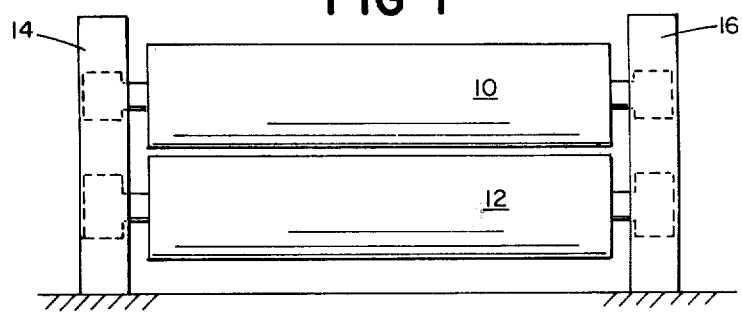
FIGS. 1 and 2 are schematic showings of side and end views of a pinch roll set.
Figure 2:
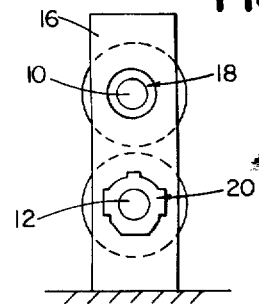

Referring now to the drawings, and particularly to FIGS. 1 and 2, the transducer of the invention may be used to measure the operating forces upon one or the other of the rolls 10 and 12 of the pinch roll set shown. In the embodiment shown herein, the horizontal and vertical forces on lower roll 12 are measured. The two rolls are supported at each end in structures 14 and 16; structure 16 is shown in an end view in FIG. 2. The end of upper roll 10 is supported in bearing support 18 and the end of lower roll 12 is supported in bearing support 20; the bearing supports are secured by suitable means, such as bolts, within structure 16. The pinch roll set, structures 14 and 16, and the bearing supports 18 and 20 are all of a generally standard design in rolling steel mills, and when measurements of rolling forces are desired, transducers must be introduced into these preexisting structures.

Figure 3:
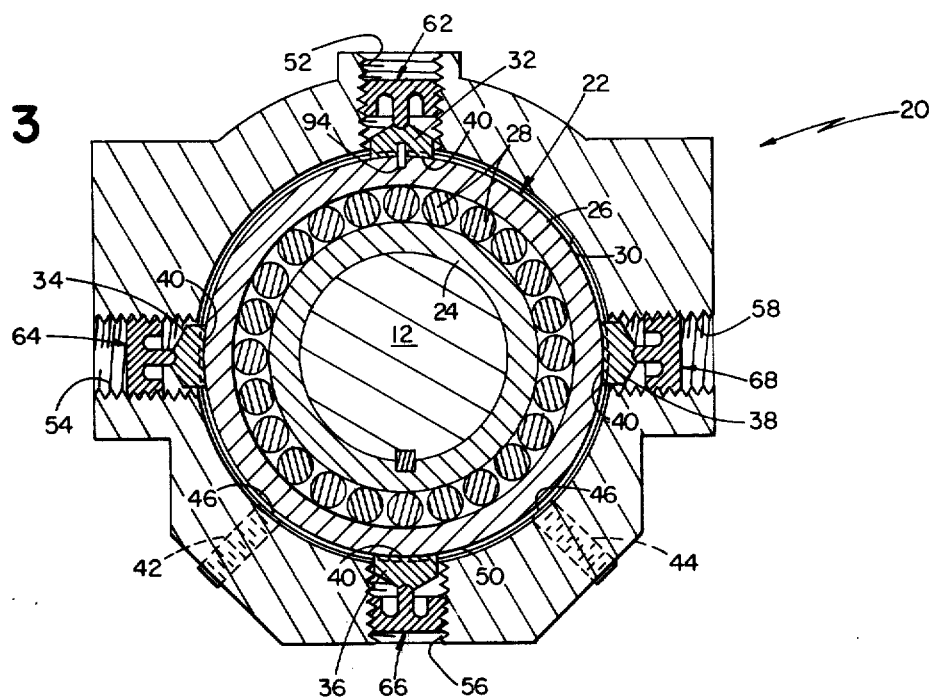
FIG. 3 is a sectional view of the mounting of one end of the lower roll in the set.

Bearing support 20 for lower roll 12, seen in detail in FIG. 3, has a generally cylindrical inner surface 30 and has four equally spaced generally cylindrical threaded passages 52, 54, 56 and 58 extending through the bearing support to inner surface 30. The inner ends of the threaded passages are enlarged to accommodate four shoes or pads 32, 34, 36 and 38, each having an inner surface 40 projecting within inner surface 30 of bearing support 20.

A conventional roller bearing 22 is supported on the four pads 32, 34, 36 and 38, and has an inner race 24, an outer non-rotatable race 26, and rollers 28. The inner surface of bearing support 20 is spaced radially outwardly from the outer surface of bearing outer race 26. In addition, in the lower portion of bearing support 20, four overtravel stops are provided, of which two are shown at 42 and 44. The ends 46 of the stops project radially inwardly beyond inner surface 30 of bearing support 20 but not so far as the inner surfaces 40 of the pads 32, 34, 36 and 38. These overtravel stops protect the lower pad 36 and its transducer 66 from destructive impact in case of extreme loads on roller 12.

Figure 4:
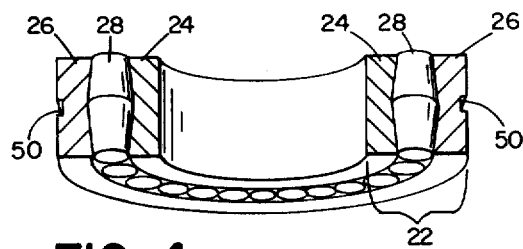
FIG. 4 is an isometric detail view of the roller bearing, including a sectional view.
Figure 5:
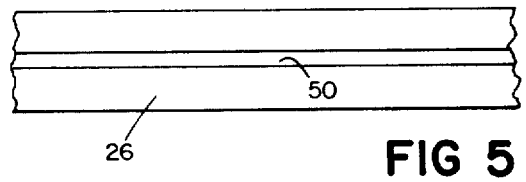
FIG. 5 is a developed view of a portion of the exterior surface of the bearing.
Figure 6:
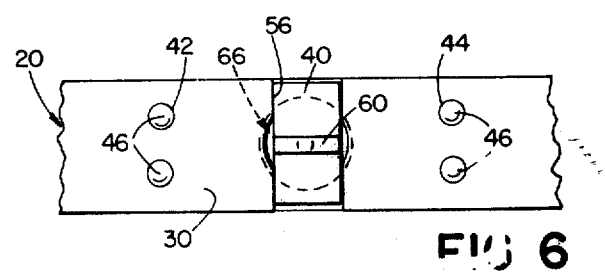
FIG. 6 is a developed view of a portion of the interior surface of the bearing support.
Figure 7:
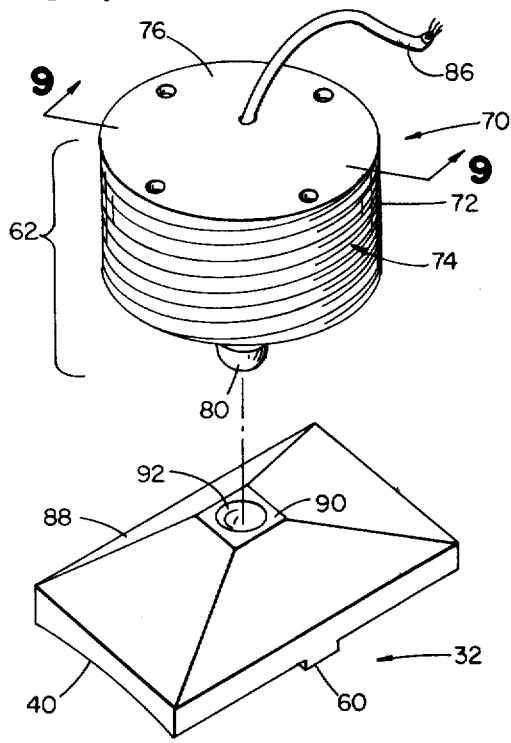
FIGS. 7 and 8 are exploded perspective views from above and below respectively of the transducer and pad.
Figure 8:
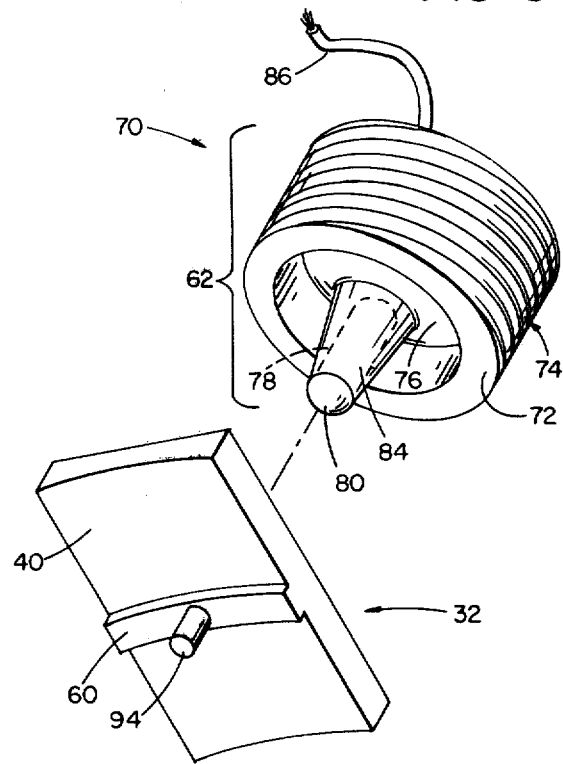
Figure 9:
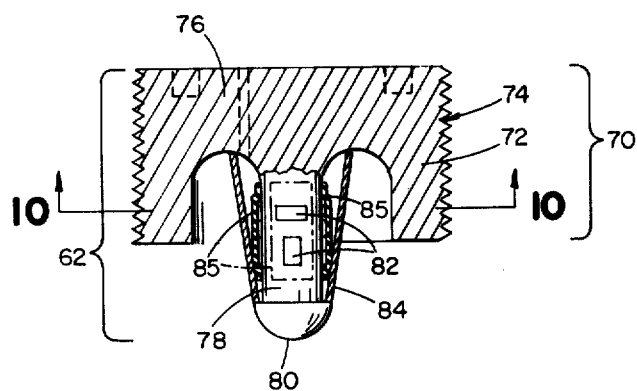
FIG. 9 is a sectional view of the transducer taken on the line 9—9 of FIG. 7.
Figure 10:
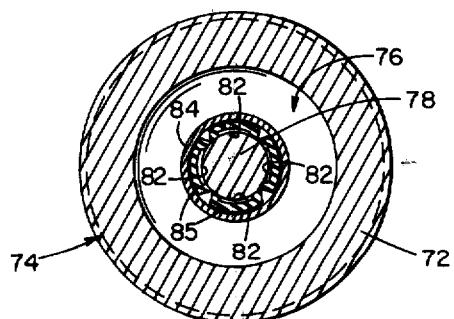
FIG. 10 is a sectional view taken on the line 10—10 of FIG. 8.

The outer surface of outer race 24 of bearing 22 includes an annular centrally located groove 50, as seen in FIGS. 4 and 5. The inner surfaces 40 of the four pads are generally formed as sections of a cylindrical surface, and include a central tongue 60, which fits within groove 50 and helps to align the bearing 22 with respect to the pads.

At least one pad is provided with a cylindrical dowel 94. Outer race 26 of roller bearing 22 is drilled out to accept dowel 94, which prevents rotation of bearing 22 which might otherwise be caused by frictional forces from rollers 28.

Four transducers or load cells 62, 64, 66 and 68 are positioned within threaded passages 52, 54, 56 and 58 respectively, and bear against pads 32, 34, 36 and 38 respectively.

Referring now especially to FIGS. 7 through 10, each of the transducers 62, 64, 66 and 68 of the invention comprises a cup shaped support portion 70 including an outer wall 72 providing threads 74, and a flat base 76 closing one end of outer wall 72. A columnar member 78 is secured to base 76 within outer wall 72 and concentrically spaced therein, and extends outwardly of cup shaped support portion 70 and somewhat beyond it, defining a reentrant profile as seen in section, as in FIG. 9. Columnar member 78 provides a generally hemispherical contact end 80. Eight pairs of strain gage elements 82 are equally spaced around columnar element 78 and secured thereto between support base 76 and contact end 80. The strain gage elements of each pair are oriented at right angles to each other. A protective shield 84 is provided around columnar element 78 and external to strain gage elements 82, and retains a waterproof layer 85, of material such as synthetic rubber, in place over each gage. Electrical connections to elements 82 are carried away from transducer 72 at 86 for connection to well-known circuitry, not shown, to derive the desired measurements from the electrical signals provided by the strain gage elements.

Pad 32 has an upper surface 88 in the form of a truncated pyramid, including a flat crown portion 90 in which is provided a hemispherical depression 92. Hemispherical contact end 80 of transducer 72 fits within depression 92 and bears against pad 32.

The four pads together with the four transducers together comprise bearing mounting means, and the non-rotatable outer race 26 of bearing 22 is externally supported solely by the bearing mounting means.

Figure 11:
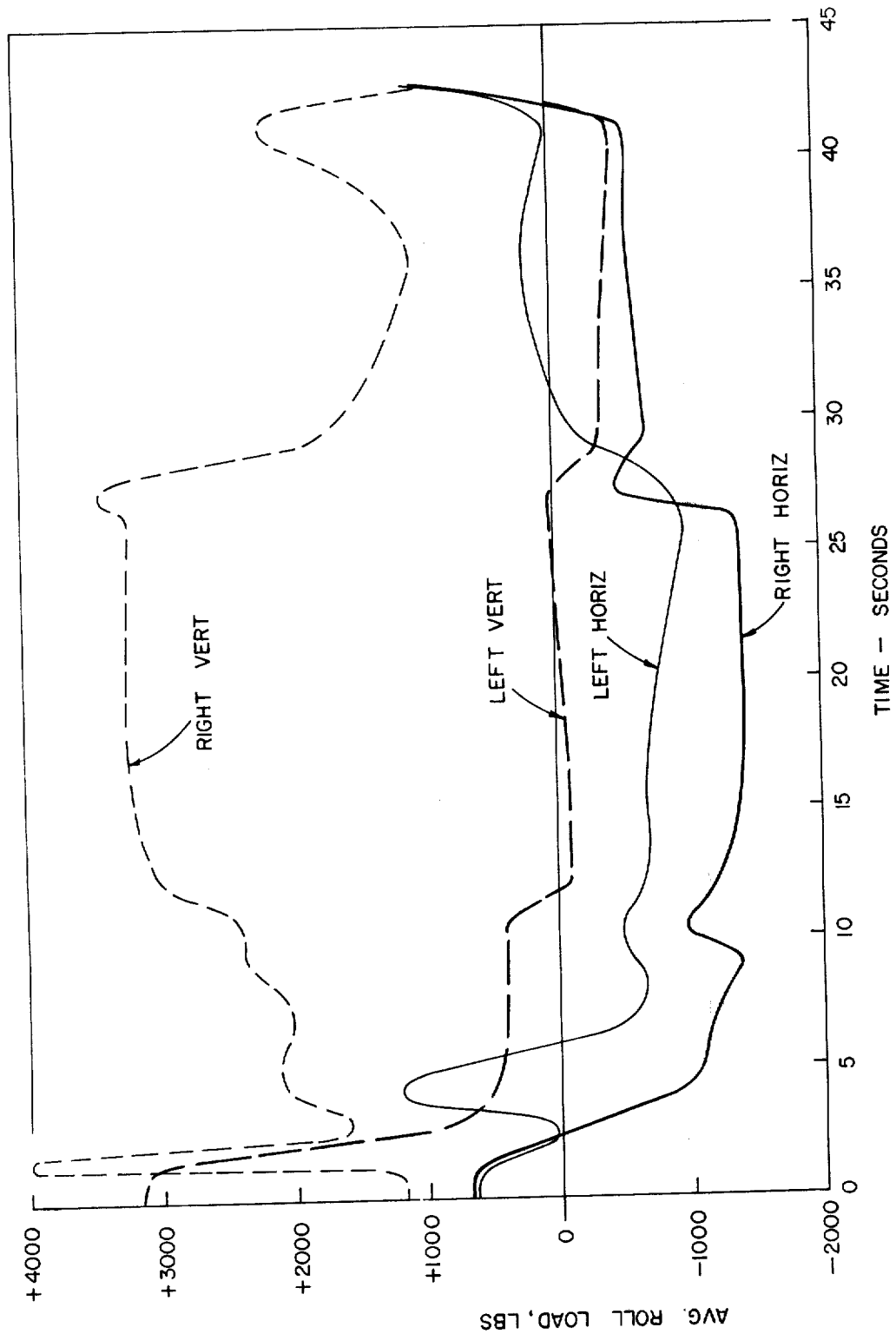
FIG. 11 is a graphical illustration of typical results obtained using the transducer of the invention as described herein.

Passages 52, 54, 56 and 58 are each sufficiently enlarged at the inner end to provide clearance to ensure that all forces exerted by the bearings on the pads are transmitted through the transducers rather than through the bearing support 20. The forces imparted to pad 32, for example, by roller bearing 22 as a result of impact on roll 12 are transmitted to columnar element 78 and are sensed by the eight pairs of strain gage elements 82. Electrical signals from the strain gage elements of all four transducers are interpreted to provide data, as shown for example in FIG. 11, where curves representing right vertical, left vertical, and right and left horizontal loads on the lower roll 12 are plotted.

The novel structure of the transducer of the invention provides a columnar element 78 sufficiently long to support the required strain gage elements 82 and to allow the imposed loads to cause uniform stress distribution on the gages. At the same time, the reentrant profile of the transducer results in an overall length considerably less than that of an equally reliable transducer of conventional form, and permits the transducer to be employed in environments providing a radially confined space, such as the bearing support 20 shown herein.

What is claimed is:

1. In combination with a bearing assembly having an outer non-rotatable element with a cylindrical outer surface positioned within a fixed bearing support having an inner surface spaced radially outwardly from said bearing non-rotatable element outer surface, bearing mounting means for measuring bearing stresses, mounting said non-rotatable element within said bearing support, said non-rotatable element being supported externally solely by said bearing mounting means, said bearing mounting means comprising a plurality of pads positioned adjacent the inner surface of said bearing support and having inner faces positioned radially inwardly of said inner surface, and a plurality of transducers mounted by said bearing support, each said transducer comprising a cup shaped support portion including an outer wall and a flat base closing one end of said outer wall, a columnar member secured to said base concentrically spaced within said outer wall and extending therebeyond, providing a contact end, and at least one strain gage element secured to said columnar member between said base and said contact end, the said contact end of a transducer being in contact with a said pad for transmission of forces from said pad to said transducer.

2. Bearing mounting means as claimed in claim 1 wherein said plurality of pads and transducers are at least three in number.

3. Bearing mounting means as claimed in claim 2, further including overtravel stop means adjacent at least one of said pads and radially positioned between a said bearing support inner surface and a said pad inner face.

* * * * *